E. C. OLIVER.
MECHANICAL COUNTING DEVICE.
APPLICATION FILED NOV. 13, 1913.

1,179,956.

Patented Apr. 18, 1916.

WITNESSES

INVENTOR
Edd C. Oliver
BY
Ralgemond A. Parker.
ATTORNEY

THE COLUMBIA PLANOGRAPH CO., WASHINGTON, D. C.

UNITED STATES PATENT OFFICE.

EDD C. OLIVER, OF DETROIT, MICHIGAN.

MECHANICAL COUNTING DEVICE.

1,179,956.  Specification of Letters Patent.  Patented Apr. 18, 1916.

Application filed November 13, 1913.  Serial No. 800,704.

*To all whom it may concern:*

Be it known that I, EDD C. OLIVER, a citizen of the United States, residing at Detroit, county of Wayne, State of Michigan, have invented a certain new and useful Improvement in Mechanical Counting Devices, and declare the following to be a full, clear, and exact description of the same, such as will enable others skilled in the art to which it pertains to make and use the same, reference being had to the accompanying drawings, which form a part of this specification.

My invention relates to mechanical counting and registering devices, and the special object of my improvements is to provide an improved device for measuring the distance traveled by automobiles, and especially one having an improved form of detent. I accomplish this object in the device illustrated in the accompanying drawing, in which,—

Figure 1:
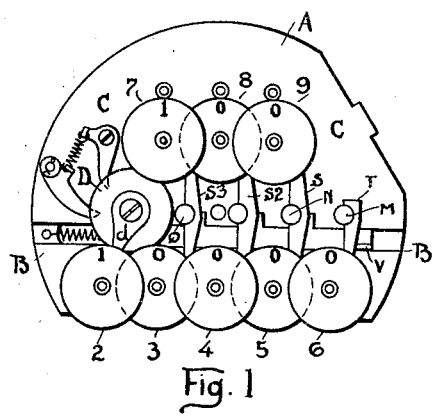
Figure 2:
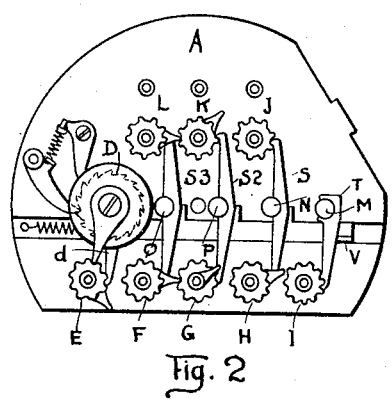
Figure 3:
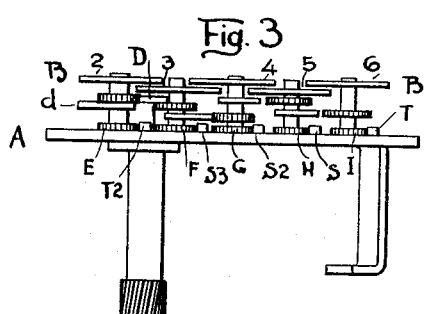
Figure 4:
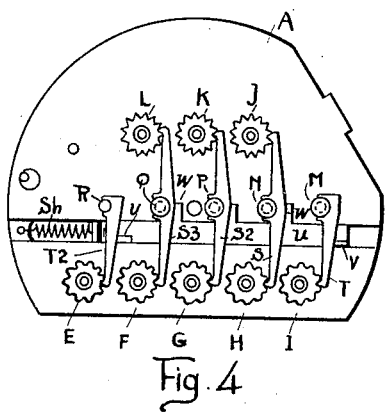
Figure 5:
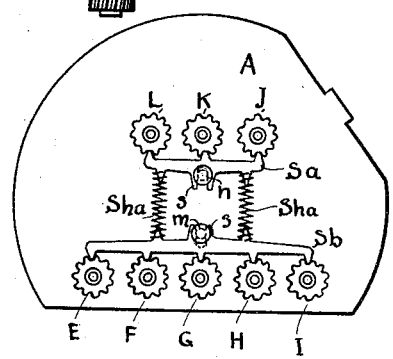
Figure 6:
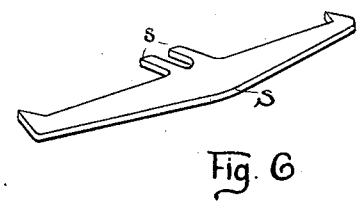

Figure 1, shows so much of a distance indicating device, as is necessary to illustrate my invention. Fig. 2, is a similar view to that of Fig. 1, the indicating disks being removed. Fig. 3, is an elevation of the parts shown in the plan of Fig. 1. Fig. 4, is a view similar to Fig. 2, parts being removed in order to clearly show the parts which normally come under the removed parts. Fig. 5, is a plan similar to Fig. 2, showing a modified construction. Fig. 6, is a perspective view of the detent used in the form shown in Figs. 1, 2, 3 and 4.

A, is a supporting plate.

B, B indicate a series of indicating disks which register the aggregate distance traveled by the vehicle to which the speedometer is attached.

C, C is a series of disks which indicate the distance traveled on each trip.

D, indicates the actuating part which is connected with a wheel of the vehicle.

E, F, G, H, I are star wheels on the shafts which carry the registering disks 2, 3, 4, 5, 6, of the series B, B.

J, K, L, indicate star wheels upon the same shafts as the registering disks 9, 8, 7.

M, N, P, Q, R indicate lugs by which the detents are guided and held in position.

S, $S^2$, $S^3$ are rods having engaging teeth at their ends and projecting lugs $s$, $s$ (Fig. 6) near their centers, which lugs embrace the lugs N, P, Q, extending from the supporting plate A. The tooth at one end of each of said rods engages a star wheel on the shafts of one of the indicators 7, 8 or 9, and the tooth of the other end of said rods engages a star wheel upon the shaft of one of the indicators 3, 4 or 5.

T, $T^2$, are rods similar to S, $S^2$, $S^3$, except that they have all beyond the lugs $s$, $s$ at one side of their centers cut away, as indicated by the dotted lines in Fig. 6. These are guided by lugs M and R extending from the supporting plate A and the single tooth at their ends engages a star wheel on the shaft of the indicator 2 or 6.

The rods S, $S^2$, $S^3$, and T, $T^2$ constitute detents. U, is a slide adapted to reciprocate transversely with reference to said detents, in ways upon the plate A.

S$h$, is a tension spring secured to the plate A, and slide U, and adapted to draw the latter toward the left, as shown in the figures.

V, V are lugs extending vertically from the slide U, and adapted to engage the levers T, $T^2$.

W, W, W, are lugs extending laterally and upwardly from the slide U and engaging the detents S, $S^2$, $S^3$ near their centers.

The lugs V, V, W, W, W, are so located that they shall engage their respective detents simultaneously and shall be pressed against said detents by the action of the spring S$h$ drawing upon the slide U.

In the modified form shown in Fig. 5, there are two detent rods S$a$, and S$b$, each of which engages all the star wheels of one series, and is provided with a series of teeth, each of which engages one of said wheels. These detent rods are provided with lugs $s$, $s$, at their centers, which engage lugs $m$ and $n$ rising from the plate A to guide the motion of said detents. There is a compression spring S$ha$, extending between the rods S$a$ and S$b$, on each side of their centers.

It will be observed that by the above described device, a single spring in the first form and two springs in the modified form may act to govern the action of a number of detents and that two or more star wheels may be controlled by the same detent.

The operation of the above described device will be easily understood, the spring S$p$ drawing upon the slide forces all the detents T, $T^2$, S, $S^2$, $S^3$ with a yielding pressure toward the left and into engagement with their respective star wheels. When a shaft having one star wheel is turned, the tooth of the detent engaging it yields and passes on to the next indentation in the wheel in the usual way. Where there are two or more teeth upon the same rod, as in the detents S, S², S³, Sa, Sb, the action of one star wheel oscillates the detent around its engagement with another star wheel. The detents T and T² are oscillated around the lugs M, R. In the former case, the lugs N, P, Q, m, n serve as guides and for securing the detents T and T² in position. In the latter case, they serve as pivots and for securing the detents T, and T², in position.

What I claim is:

1. The combination of a plurality of star wheels, a detent having offset teeth rigidly connected therewith adapted to engage each of said star wheels, and means acting on said detent between said teeth for yieldingly pressing the same toward the wheels which said teeth engage, said detent being adapted to oscillate and being movable laterally of itself as a whole to engage said teeth.

2. The combination of a plurality of star wheels, a bodily movable detent having teeth rigidly secured thereto adapted to engage each of said star wheels, means for yieldingly pressing said detent toward said star wheels and a guide permitting a reciprocation and oscillation of said detent.

3. A series of star wheels, a detent having teeth rigid therewith adapted to engage each of said star wheels of said series, a second series of star wheels located opposite to the first series, a second detent having teeth rigid therewith adapted to engage the teeth of each of the star wheels of said second series, means for guiding said detents permitting an oscillatory and reciprocating motion thereof, and a resilient member extending between said detents and acting to force one of said detents toward the star wheels with which it is adapted to engage and reacting to force the other of said detents toward the star wheels with which it is adapted to engage.

4. A series of star wheels, a detent having teeth rigid therewith adapted to engage each of said star wheels of said series, a second series of star wheels located opposite to the first series, a second detent having teeth rigid therewith adapted to engage the teeth of each of the star wheels of said second series, means for guiding said detents permitting an oscillatory and reciprocating motion thereof, and a resilient member extending between said detents and acting to force one of said detents toward the star wheels with which it is adapted to engage, and reacting to force the other of said detents toward the star wheels with which it is adapted to engage, said resilient member being secured in place by its engagement with said detents.

5. In a device of the character described, the combination of a plurality of star wheels, and a detent comprising an elongated rigid bar bridging the space between the star wheels and having adjacent its ends offset teeth to engage said wheels, a rigid guide member for the bar arranged substantially midway between the ends of the same, and spring means for normally maintaining the teeth of said bar in contact with said star wheels.

6. In a device of the character described, the combination of a plurality of star wheels, and a detent comprising an elongated rigid bar bridging the space between the star wheels and having adjacent its ends offset teeth to engage said wheels, a rigid guide member for the bar arranged substantially midway between the ends of the same, said bar having a slotted portion engaging over said guide whereby the bar is adapted for reciprocation and oscillation, and spring means for pressing the bar in a direction to normally hold the teeth in engagement with the star wheels.

In testimony whereof, I sign this specification in the presence of two witnesses.

EDD C. OLIVER.

Witnesses:
AGNES M. HIPKINS,
ELLIOTT J. STODDARD.

Copies of this patent may be obtained for five cents each, by addressing the "Commissioner of Patents Washington, D. C.'